(12) United States Patent
Rogg (10) Patent No.: US 7,225,549 B2
(45) Date of Patent: Jun. 5, 2007

(54) PROCESS AND DEVICE FOR MEASURING ANGLES IN THE HORIZONTAL PLANE

(76) Inventor: Werner Rogg, Deutenbergring 63, D-78056 Villingen-Schwenningen (DE)

( * ) Notice: Subject to any disclaimer, the term of this patent is extended or adjusted under 35 U.S.C. 154(b) by 0 days.

(21) Appl. No.: 10/840,490

(22) Filed: May 6, 2004

(65) Prior Publication Data
US 2004/0223138 A1    Nov. 11, 2004

(30) Foreign Application Priority Data
May 6, 2003    (DE) ................... 103 20 039

(51) Int. Cl.
*G01C 15/00* (2006.01)
(52) U.S. Cl. .................. 33/286; 33/DIG. 21
(58) Field of Classification Search .............. 33/286, 33/288, DIG. 21
See application file for complete search history.

(56) References Cited

U.S. PATENT DOCUMENTS

| 3,603,688 | A | * | 9/1971 | Smith-Vaniz | 33/286 |
| 4,904,081 | A | * | 2/1990 | Miyahara | 33/286 |
| 5,402,226 | A | * | 3/1995 | Matthews et al. | 33/286 |
| 5,960,551 | A | * | 10/1999 | Nishi et al. | 33/292 |
| 6,049,378 | A | | 4/2000 | Busch et al. | |
| 6,098,297 | A | * | 8/2000 | Belfiore | 33/286 |
| 6,347,457 | B1 | * | 2/2002 | Espinoza et al. | 33/288 |
| 6,710,319 | B2 | * | 3/2004 | Ohtomo et al. | 33/285 |
| 6,732,439 | B1 | * | 5/2004 | Radke et al. | 33/286 |
| 6,807,740 | B2 | * | 10/2004 | Reed et al. | 33/286 |
| 2001/0037579 | A1 | * | 11/2001 | Akers | 33/286 |

FOREIGN PATENT DOCUMENTS

| DE | 197 33 919 A1 | 2/1999 |
| DE | 200 03 940 U1 | 6/2000 |
| DE | 199 31 868 A1 | 3/2001 |

* cited by examiner

*Primary Examiner*—Yaritza Guadalupe-McCall
(74) *Attorney, Agent, or Firm*—Akerman Senterfitt; Stephan Pendorf; Peter A. Chiabotti (57) ABSTRACT

The invention concerns a process and a device for measuring angles relative to the horizontal plane of elements in vehicles, with at least one laser (L) and at least one target (Z), which are located via adapters (10, 20, 30, 40) on the element to be measured in such a manner that the at least one laser (L) and the at least one target (Z) are located in one horizontal plane parallel to the plane of the element to be surveyed, wherein the adapters (10, 20, 30, 40) are designed such that the at least one laser (L) is situated parallel to the axis of the first of the two elements to be measured and the at least one target (Z) is situated perpendicular to the axis of the second of the two elements to be measured.

15 Claims, 6 Drawing Sheets

PROCESS AND DEVICE FOR MEASURING ANGLES IN THE HORIZONTAL PLANE

BACKGROUND OF THE INVENTION

1. Field of the Invention

The invention concerns a process and a device for measuring angles in the horizontal plane.

2. Description of the Related Art

In order to determine the angle of tilt of an element with respect to the horizontal plane, generally use is made of gravity. For example, U.S. Pat. No. 4,707,927 discloses an inclination sensor, which measures its spatial tilt with respect to the horizontal plane by means of an electrically conductive fluid, which is enclosed in a spherical intermediate space, which is formed by a spherical common electrode and four opposing suitably shaped detecting electrodes. The liquid moves according to the angle of tilt of the sensor, thereby setting up electrostatic capacity between the electrodes, which is detected using readout electronics. Further, it is known from U.S. Pat. No. 4,716,534 to use a sensor for measuring the angular alignment of a reference surface in relation to the gravitational vector, using a rotatably mounted disk upon which a weight is mounted eccentrically to keep the disk in a relatively constant position relative to the gravitational vector, which disc is provided with graduated markings along the edge, which markings are electronically detectable, e.g. by a photodetector. This type of angular measurement is however not suitable to measure angles in the horizontal plane (angle of tilt). For this, it is necessary to employ optical measuring processes, for example involving a laser.

SUMMARY OF THE INVENTION

The problem to be solved by the invention is comprised therein, of providing a simple as possible and cost effective process for measuring of angles in the horizontal plane in difficult to access elements in vehicles, such as, for example, articulated shafts.

The problem is inventively solved by a process for measuring of angles in the horizontal plane according to Patent claim 1 and a device for measuring angles in the horizontal plane according to Patent claim 11.

The inventive process for measuring angles in the horizontal plane of elements in a vehicle employs at least one laser and at least one target, which are attached to the element to be measured using adapters in such a manner, that the at least one laser and the at least one target are situated in a horizontal plane parallel to the plane of the element to be measured, wherein the adapter is of the type, that the at least one laser is situated parallel to the axis of one of the two elements to be measured, and the at least one target is situated perpendicular to the axis of the second of the two elements to be measured. The laser is oriented by means of the adapter in a fixed predetermined position relative to the one of the elements to be measured. As a result, the laser beam runs parallel to the axis of the element. The target is likewise positioned by means of the suitable adapter in such a manner, that the disk is located in the plane of the laser. Therein it is oriented perpendicular to the axis of the second of the two elements to be measured. If the two axis of the elements to be measured correspond (are identical), then the laser meets the center of the target. An angle of the axis of the element to be measured produces a deviation of the meeting point of the laser beam on the target. In the case that the distance of the laser and the target are known, the exact angle between the two axis of the elements to be measured can be determined. The shifting of the angular measurement into a horizontal plane parallel to the plane of the element to be measured offers the advantage of being able to carry out an angular measurement even in the case of the presence of additional, potentially interfering, elements.

In a preferred refinement of the invention the adapter is mounted using spiral threads in a fixed predetermined position with respect to the element to be measured. The adapter is thereby reliably fixed and it is located in a defined position relative to the element to be measured. The target or, as the case may be, the laser, which are mounted to the adapter, are therewith automatically precisely oriented. There is no need for further adjustment by hand.

Alternatively, the adapters can be magnetically attached to the elements. The adapters can therewith be reliably fixed to the elements without great effort, wherein this type of adapter is suitable in particular for those types of elements to which no supplemental threading for mounting can be applied, or elements which are not automatically in a defined position when the vehicle is at rest. For example, drive shafts or wheel axles rotate about their longitudinal axis, so that a groove or a recessed threaded bore or the like applied to their outer circumference is not automatically horizontally or vertically oriented, so that a securing of an adapter to a threading is not possible.

Further, adapters which can be applied to a rotating element are not automatically vertically oriented, since a rotation about the axis of the element is still possible. Thus, the adapters preferably can be oriented vertically using a level incorporated in the adapter.

In a preferred embodiment of the invention an adapter with a target and an adapter with a laser are alternatingly employed.

Preferably, the laser can be rotated or swiveled 180° in the adapter in the horizontal plane. Therewith, using only a single laser, the angle of tilt of two adjacent elements, to each of which is applied an adapter with a target, can be measured.

Preferably, the adapter with a laser is located between two adapters each of which are provided with two targets back-to-back. Therewith a single adapter on one element is sufficient for determining the bearings of two elements adjacent thereto, to which respectively one adapter with a laser is provided, and therewith to determine the two adjacent angles of inclination.

Preferably the same set distance or spacing is provided between each respective laser and each respective target. Thereby the measured angles are precisely defined, and one single type of target with graduated markings or a scale is sufficient for measuring the angle of tilt.

In a preferred embodiment of the invention the laser and the target are fixed with a predetermined separation with the aid of a level and a spacer pipe or measuring stick. To separate the two adaptors with a predetermined spacing, it is sufficient to attach the spacer pipe to the two adapters, thereby avoiding the need for any laborious distance measurements.

Preferably the adapters are provided with receptacles, upon which angular measuring devices for measuring the angle relative to the horizon can be mounted to seated. Therewith, following a pre-adjustment, a level (bubble-level) can be used to precisely determined whether the receptacle surfaces are horizontal, therewith to confirm that the adapters are oriented vertically.

The inventive device for measuring angles to the horizontal plane of elements in vehicles includes at least one laser and at least one target, which can be applied to the element to be measured via an adapter. Therein the adapters are of such a length, that the at least one laser and the at least one target can be positioned in the horizontal plane parallel to the plane of the elements to be measured. Therein the adapter is mountable on the elements in such a manner, that the at least one laser can be oriented along the axis of the first element to be measured and the at least one target can be oriented perpendicular to the axis of the second of the two elements to be measured.

Preferably the adapters include an attachment element, which is optionally adapted to the element to be measured.

The adapter to be applied to a transmission includes a threading for fixing at a pre-determined position. An adapter of this type need not be aligned and offers an excellent starting point for the alignment of the further adapters.

The adapters for attachment to an articulated shaft include an attachment element comprised of two surfaces running at right angles to each other. By placement of the angled surfaces against the round articulated shaft, the longitudinal sides of the surfaces are automatically oriented parallel to the axis of the articulated shaft. The adapters are now free only be rotated about the articulated shaft, whereupon they can be oriented vertically using a level which is incorporated into the adapter. Preferably the adapters further include a receptacle surface, which runs parallel to the longitudinal sides of the right-angled attachment surface, so that measuring devices for measuring the angle can be seated horizontally upon the receptacle surface, whereby the vertical orientation of the adapter can be verified.

The adapter includes a Y-shaped attachment element for attachment to the rear axle center-piece, and lies form-fittingly against the rear axle center piece. Therewith this adapter is fixed or mounted without additional orientation to a definite predetermined position with regard to the rear axle center-piece.

BRIEF DESCRIPTION OF THE DRAWING

The invention will be described in greater detail in the following on the basis an illustrative embodiment shown in the following figures. There is shown.

DETAILED DESCRIPTION OF THE INVENTION

Figure 1:
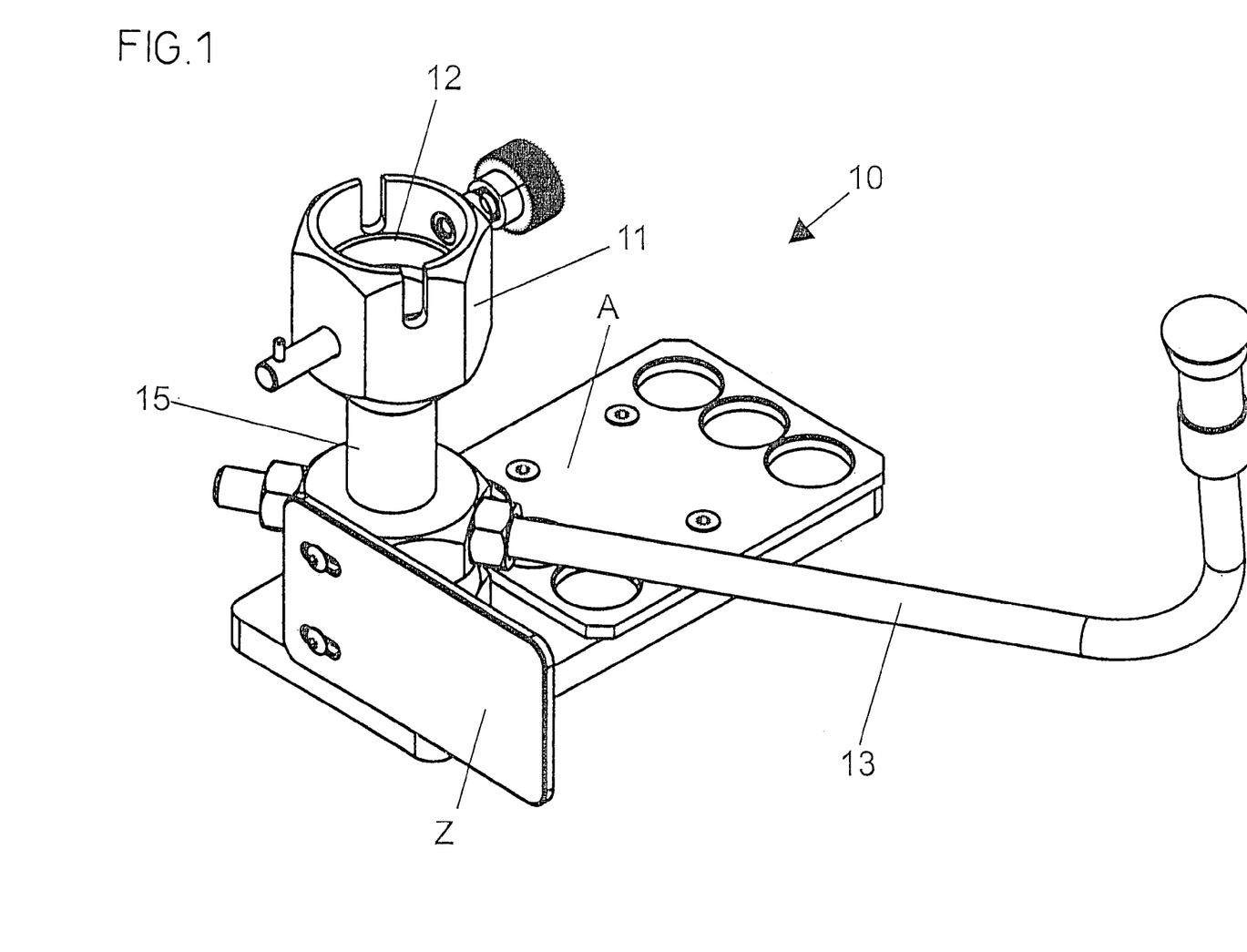
FIG. 1 an adapter with threads and target.

FIG. 1 shows a first adapter, which is preferably employed as a transmission adapter 10. The transmission adapter 10 includes a rectangular receiving surface A, upon which a sensor can be seated for horizontally orienting the transmission adapter 10.

Perpendicularly on the receiving surface A is provided a cylindrical transition piece 15, upon which the centering or truing unit 11, with built-in magnets, is secured. The centering or truing unit 11 includes a cylindrical recess 12, of which the axis is perpendicular to the receiving surface A.

For securing the transmission adapter 10 to the transmission the recess 12 is seated upon a plug, which is screwed into the transmission via a threaded borehole. The transmission adapter 10 can therewith initially freely rotate with the plug. For the exact orientation of the transmission adapter 10 an abutment rod 13 is provided on the U-shaped transmission piece 15, via which the transmission adapter 10, during rotation about the plug, abuts in a position of the transmission, and therewith becomes oriented.

A target Z is provided on the front side of the receiving surface A and perpendicular thereto. In the case of exact orientation of the transmission adapter 10, the target Z is oriented precisely perpendicular to the transmission axis. The horizontally running symmetric axis of the target Z thereby lies in the horizontal plane in which the measurement of the angle of inclination, in the case of using the adapter for measuring an articulated shaft, takes place.

Figure 2:
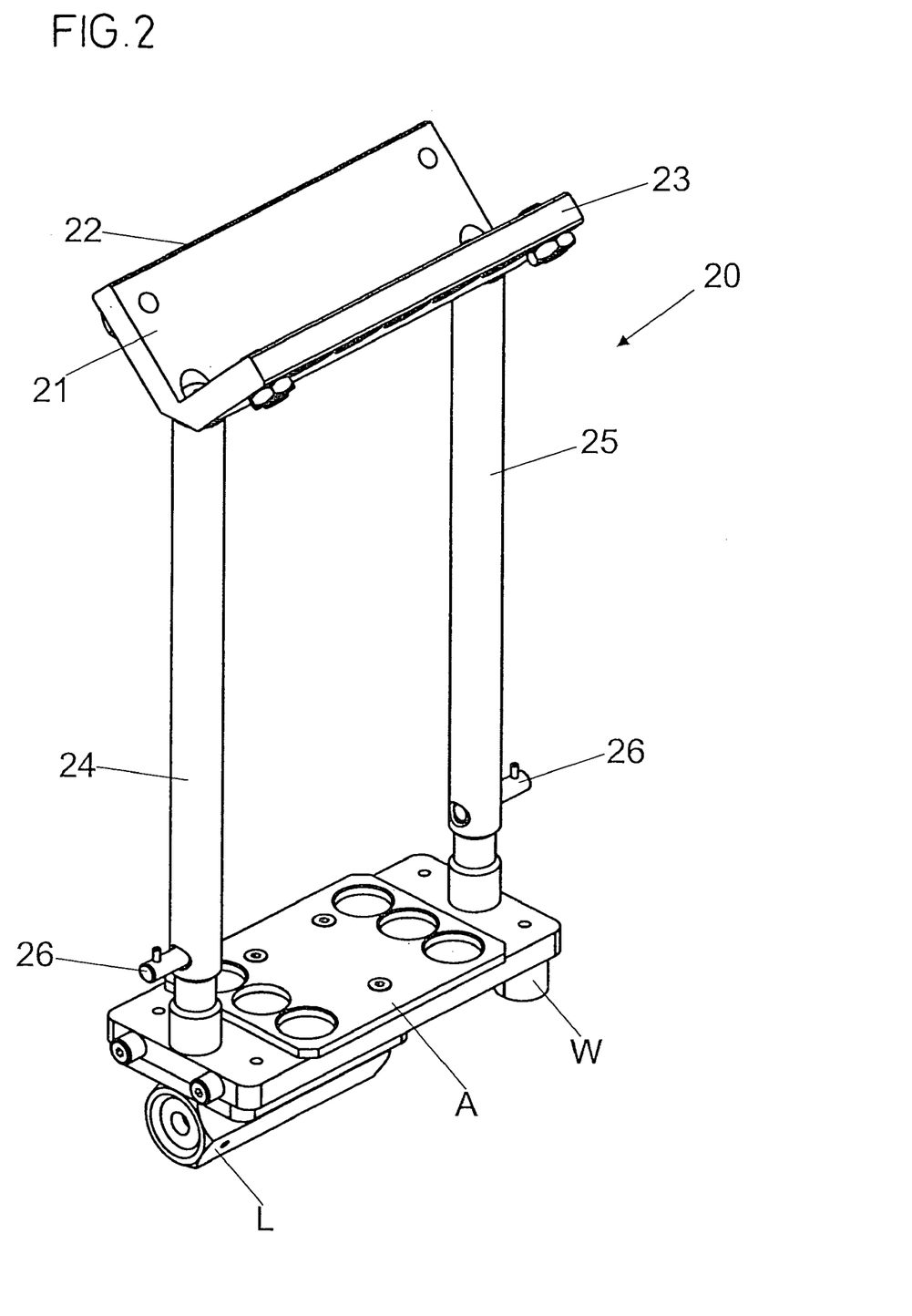
FIG. 2 an adapter with receiving surface and laser.

FIG. 2 shows a further adapter, which preferably is used as an articulated shaft adapter 20. The first articulated shaft adapter 20 includes a magnetic mounting surface 21, which is comprised of a rectangular plate, which is bent along the longitudinal axis of symmetry into a right-angle. By the thus formed mounting surface 21 the first articulated shaft adapter 20 can be seated upon the articulated shaft such that the longitudinal axis of symmetry of the mounting surface 21 and the two longitudinal sides 22 and 23 of the mounting surface 21 are always parallel to the axis of the articulated shaft.

The mounting surface 21 is connected with a receptacle surface A via two rods 24 and 25 in such a manner that the two longitudinal sides 22 and 23, and receptacle surface A as well as mounting surface 21 running parallel thereto, form a rectangle.

A laser L is mounted to the lower side of the receptacle surface A in such a manner that it is oriented centered below the receptacle surface A, and the laser axis runs parallel to the longitudinal axis of symmetry of the mounting surface 21. If the first articulated shaft adapter 20 is seated on the articulated shaft, then accordingly the laser axis runs parallel to the articulated shaft axis. The length of the two rods 24 and 25 are therein so measured, that in addition the laser axis runs in the same horizontal plane as the longitudinal axis of symmetry of the target Z of the transmission adapter.

Further, a water level (bubble level) W is provided on the lower side of the receptacle surface A, which serves for the pre-adjustment of the receptacle surface in the horizontal plane.

Figure 3:
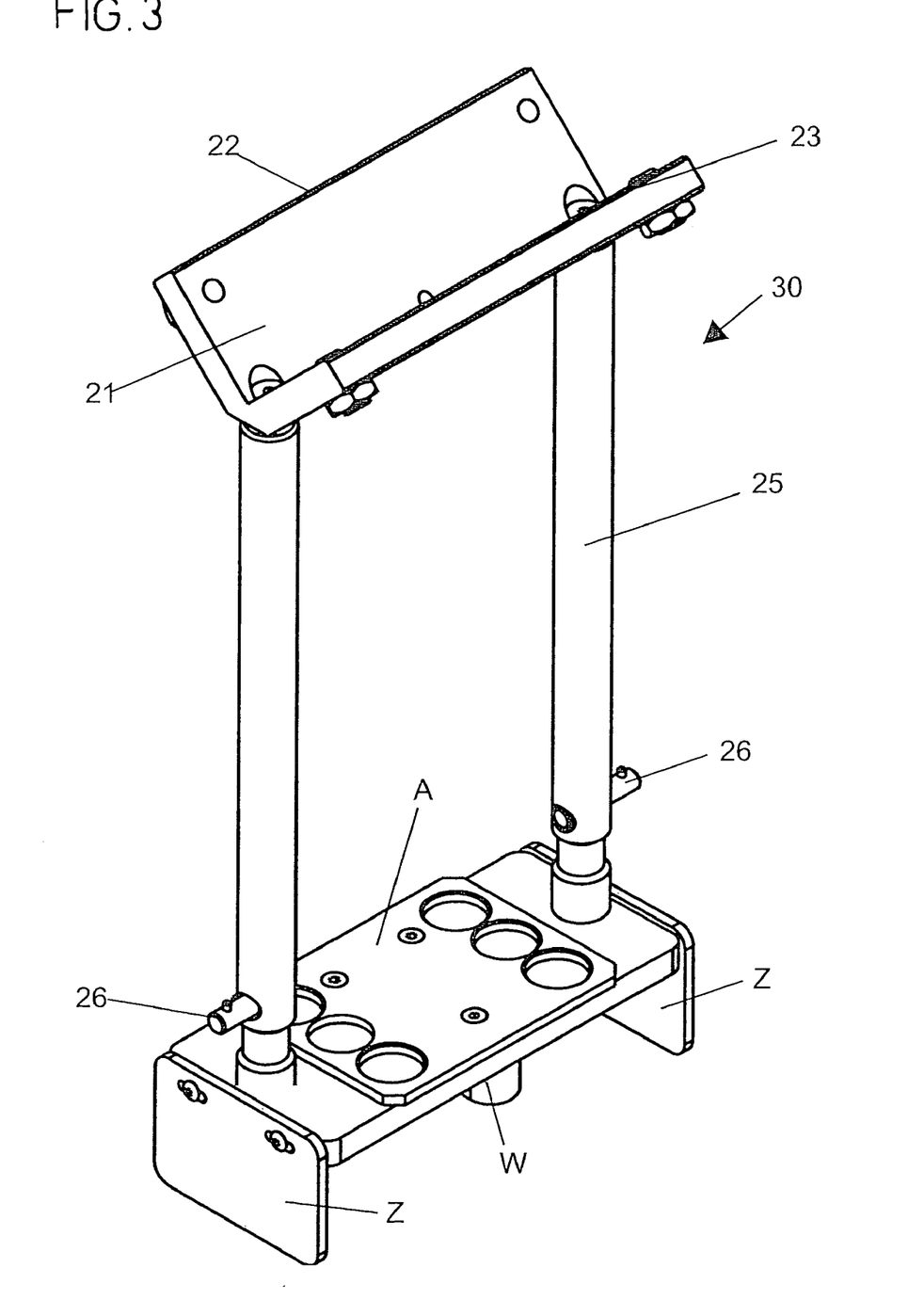
FIG. 3 an adapter with receiving surface and target.

FIG. 3 shows a second articulated shaft adapter 30, which differs from the first articulated shaft adapter 20 essentially in that in place of a laser L two targets Z are provided on the two sides of the receptacle surface A in such a manner that the surfaces of the targets Z run perpendicular to the receptacle surface A. If the second articulated shaft adapter 30 is seated on the articulated shaft via it's mounting surface 21, then accordingly the target Z runs perpendicular to the axis of the articulated shaft. The target Z therein lies, again, with its horizontal axis of symmetry in the horizontal plane in which the measurement of the angle of inclination of the articulated shaft is being carried out.

Figure 4:
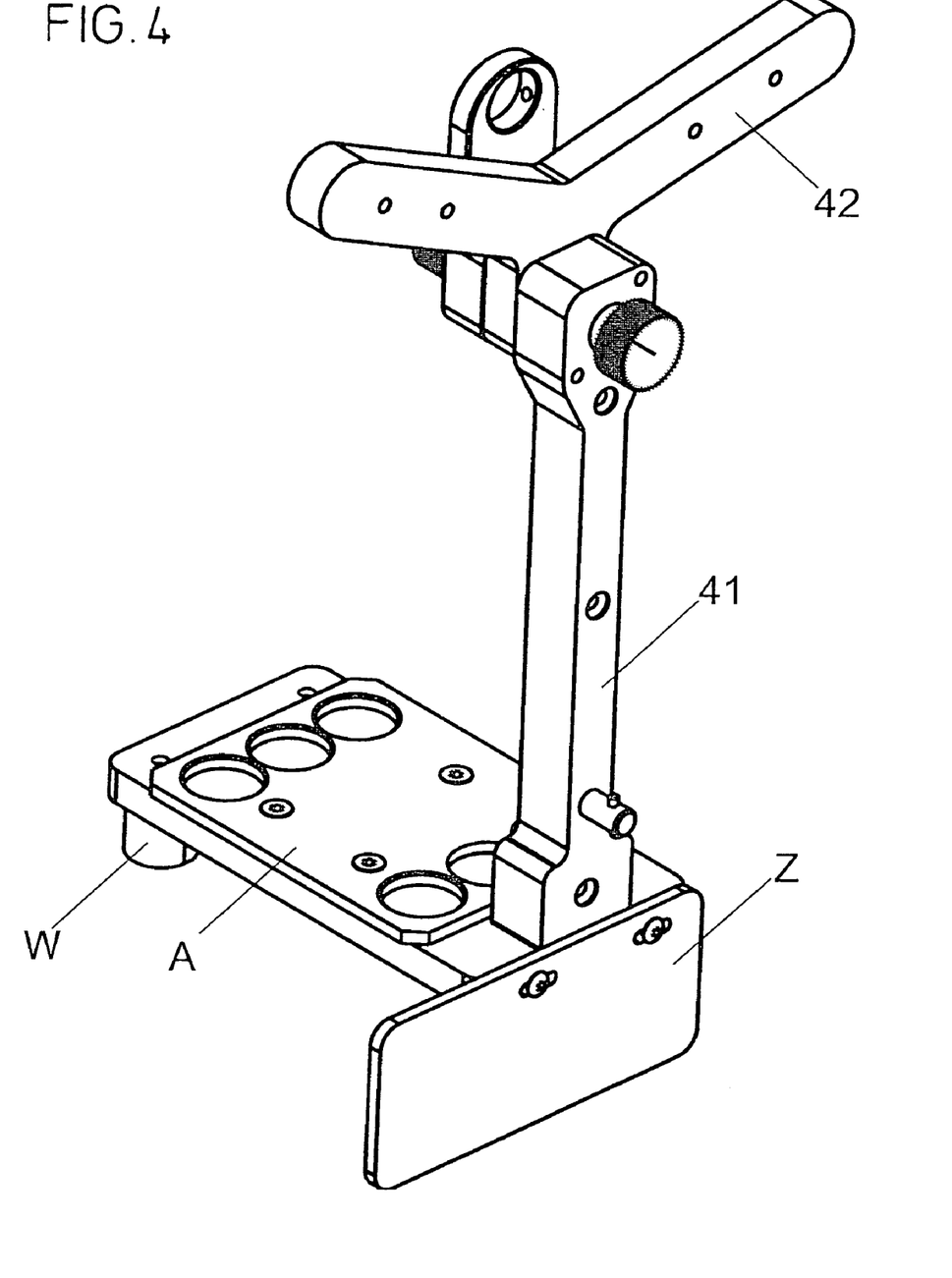
FIG. 4 an adapter with form-fitting arrangement of attachment and target.

FIG. 4 shows a further adapter, which is used as rear axle center-piece adapter 40. The rear axle center-piece adapter 40 includes a receptacle surface A, on one surface of which a target Z is provided in such a manner that the surface of the target Z runs perpendicular to the receptacle surface A.

A transition piece 41 is provided perpendicularly on the receptacle surface A, on the free end of which is provided a magnetic Y-shaped attachment element 42. The two arms of the Y-shaped attachment element 42 are at such an angle to each other that a form-fitting attachment of the attachment element 42 to the rear axle center-piece is ensured. The attachment occurs in such a manner that the target Z runs perpendicular to the ideal or imaginary extension of the articulated shaft axis or, as the case may be, parallel to the rear axle. The length of the transition piece 41 is so selected, that the longitudinal axis of symmetry of the target z again lies in the same horizontal plane as the longitudinal axis of symmetry of the target of the transmission adapter or, as the case may be, the second articulated shaft adapter.

Figure 5:
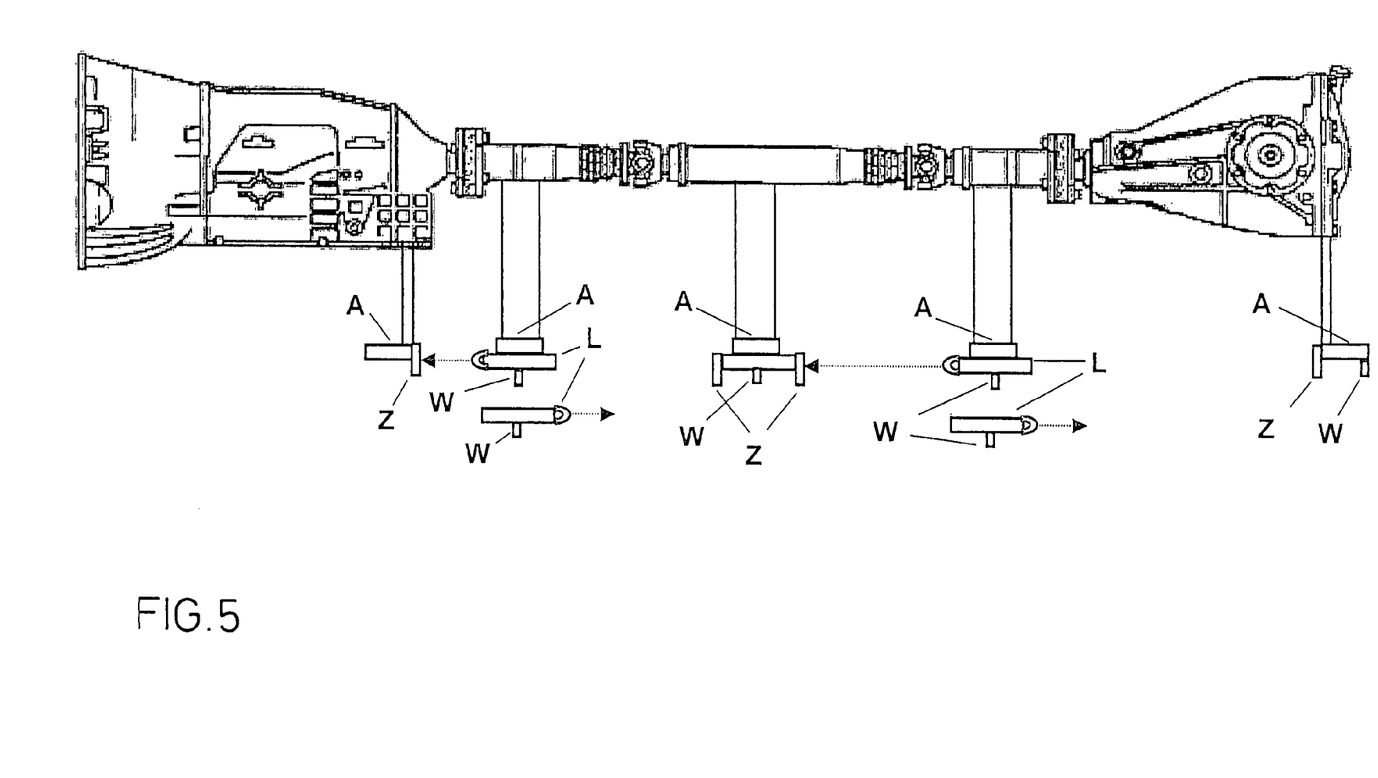
FIG. 5 use of the adapter for surveying an articulated shaft in side view.
Figure 6:
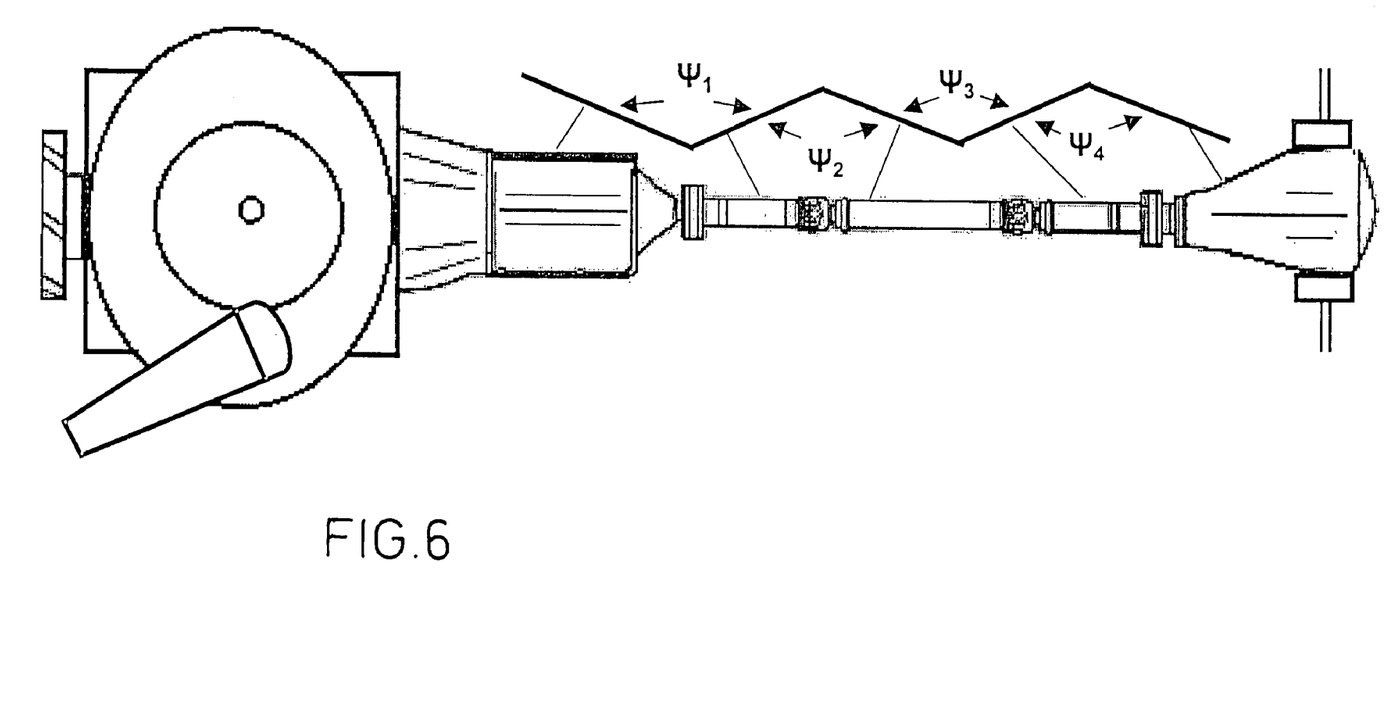
FIG. 6 measuring an articulated axis, viewed from above.

FIGS. 5 and 6 illustrate the use of the inventive adapters for surveying angles of inclination of an articulated shaft. A precondition for this type of measurement is that the articulated shafts already are oriented horizontally, so that the angle in the horizontal plane can now measured using the inventive device.

First, the transmission adapter 10 is applied to the transmission. As a result of the abutment of abutment rod 13 the transmission adapter 10 is fixed in a defined predetermined position relative to the transmission.

The first transmission shaft adapter 20 is seated upon the forward part of the articulated shaft. As a result of the contour of the attachment surface 21, the axis of the laser L is already oriented parallel to the axis of the articulated shaft. By means of the level W provided on the lower side of the receptacle surface A the first articulated shaft adapter 20 is generally oriented horizontally. Subsequently a sensor can be seated or laid upon the receptacle surface A, which measures the tilt angle relative to horizontal and makes it possible to orient the receptacle surface A exactly horizontally. The rods 24 and 25 are dimensioned in their length relative to each other such that the laser beam of the laser L impinges upon the target Z of the transmission adapter 10 in the longitudinal symmetrical axis of the target Z.

For the exact angular measurement between the front part of the articulated axis and the transmission, a defined spacing between the transmission adapter 10 and the first articulated shaft adapter 20 must be established. For this, a pipe with a fixed length (650 mm) is employed. Projections 26 are provided on the adapters onto which the pipe is introduced, after which the two adapters are slid together as close as possible. The spacing between the adapters 10, 20, 30 and 40 is therewith precisely defined.

On the target Z a scale or gradient is provided. If the laser beam of the first articulated shaft adapter 20 impinges upon the target Z of the transmission adapter 10, then the deviation of the impingement point of the laser beam from the center of the target Z corresponds to the tilt angle $\psi_1$ between the forward part of the articulated shaft and the transmission (see FIG. 6).

The second articulated shaft adapter 30 is next seated with the attachment surface 21 on the central part of the articulated shaft. The target Z is automatically oriented perpendicular to the axis of the central articulated shaft piece. The second articulated shaft adapter 30 is then, in turn, preadjusted with the aid of the level W and subsequently precisely vertically oriented by means of a tilt sensor, which is placed upon the receptacle surface A. The distance between the first articulated shaft adapter 20 and the second articulated shaft adapter 30 is fixed with an aid of a spacer pipe, which is seated upon projections 26 of the first articulated shaft adapter 20 and upon projections 26 of the second articulated shaft adapter 30.

The laser L of the first articulated shaft adapter 20 can be rotated 180° on the receptacle surface A, so that the laser beam impinges upon the target Z of the second articulated shaft adapter 30, which faces the first articulated shaft adapter 20. Since the laser beam runs parallel to the front part of the articulated shaft and the target Z of the second articulated shaft adapter 30 runs perpendicular to the axis of the central articulated shaft piece, and the distance of the first articulated shaft adapter 20 and the second articulated shaft adapter 30 are fixed by means of the spacer pipe, the deviation between the impingement point of the laser beam from the center of the target Z of the second articulated shaft adapter 30 produces the inclination angle $\psi_2$ between the front part of the articulated shaft and the articulated shaft center piece.

In order to measure the angle of inclination $\psi_3$ between the central part of the articulated shaft and the rear part of the articulated shaft, an additional first articulated shaft adapter 30 is seated on the rear part of the articulated shaft and is adjusted just like the second articulated shaft adapter 30. The distance of the second articulated shaft adapter 30 and the additional first articulated shaft adapter 20 is again fixed using the pipe. The laser L of the additional first articulated shaft adapter 20 is oriented on the second target Z of the second articulated shaft adapter 30, wherein by the precise alignment of the laser beam in the longitudinal symmetrical plane it impinges the target Z, and the angle of inclination $\psi_3$ can be read off just like before.

Subsequently, the rear axle center-piece adapter 40 can be positioned on the rear axle center-piece using the Y-shaped attachment element 42. The position of the rear axle center piece adapter 40 is fixed by the form-fitting attachment. In the case of the precise alignment of all adapters, the separation between the first articulated shaft adapter on the rear articulated shaft piece and the rear axis center piece adapter 40 is fixed.

Laser L of the first articulated shaft adapter 20 is rotated around 180° on the rear articulated shaft piece and directed towards the target Z of the rear axle center-piece adapter 40. The deviation between the impingement point of the laser and the center of the target Z corresponds to the inclination angle $\psi_4$ between the rear articulated shaft piece and the rear axle center-piece.

REFERENCE NUMBER LIST 10 transmission adapter
11 centering or truing unit
12 recess
13 abutment rod
15 transition piece
20 first articulated shaft adapter
21 receptacle surface
22 longitudinal side
23 longitudinal side
24 rod
25 rod
26 projection
30 second articulated shaft adapter
40 rear axle center-piece adapter
41 transition piece
42 mounting element
A receptacle surface
W level
Z target
L laser
$\psi_1$ angle of inclination
$\psi_2$ angle of inclination
$\psi_3$ angle of inclination
$\psi_4$ angle of inclination

The invention claimed is:

1. A process for measuring angles in the horizontal plane of elements in vehicles, with at least one laser (L) and at least two targets (Z), which are mounted on the elements to be measured via adapters (10, 20, 30, 40) in such a manner that the at least one laser (L) and the at least two targets (Z) are located in a horizontal plane parallel to the plane of the element to be surveyed, wherein the adapters (10, 20, 30, 40) are so designed, that the at least one laser (L) is oriented parallel to the axis of the first element to be measured and the at least two targets (Z) are oriented perpendicular to the axis of at least a second element to be measured, wherein the spacing between each laser (L) and each target (Z) respectively is identical;

wherein said design shows an alternating staging of an adapter (10, 30, 40) with a target (Z) and an adapter (20) with a laser (L).

2. A process according to claim 1, wherein a screw thread is used to bring the adapter (10) into a precise predetermined position relative to the element to be measured.

3. A process according to claim 1, wherein the adapters (20, 30, 40) are mounted magnetically on the elements to be measured.

4. A process according to claim 1, wherein the adapters (10, 20, 30, 40) can be oriented vertically via a level (W) placed on the adapters (10, 20, 30, 40).

5. A process according to claim 1, wherein between two adapters (20) provided with lasers (L), there are staged adapters (30) with back-to-back targets (Z).

6. A process according to claim 1, wherein the laser (L) can be rotated 180° in the horizontal plane on the adapter (20).

7. A process according to claim 1, wherein the adapters (10, 20, 30, 40) include a receptacle surface (A), upon which angular measuring devices can be seated for measuring of angles relative to the horizontal.

8. A process for measuring angles in the horizontal plane of elements in vehicles, with at least one laser (L) and at least one target (Z), which are mounted on the elements to be measured via adapters (10, 20, 30, 40) in such a manner that the at least one laser (L) and the at least one target (Z) are located in a horizontal plane parallel to the plane of the element to be surveyed, wherein the adapters (10, 20, 30, 40) are so designed, that the at least one laser (L) is oriented parallel to the axis of the first element to be measured and the at least one target (Z) is oriented perpendicular to the axis of the second element to be measured, wherein the laser (L) and the target (Z) are fixed in a defined spacing using a level (L) and a pipe which predetermines the spacing in a lengthwise direction between the laser (L) and the respective target (Z) of the laser.

9. A device for measuring angles in the horizontal plane of elements in vehicles with at least one laser (L) and at least one target (Z), which are mounted on the elements to be measured via adapters (10, 20, 30, 40) in such a manner, that the at least one laser (L) and the at least one target (Z) are located in a horizontal plane parallel to the plane of the element to be surveyed, wherein the adapters (10, 20, 30, 40) are so designed, that the at least one laser (L) can be oriented along the axis of the one element to be measured and the at least one target (Z) can be oriented perpendicular to the axis of the second of the two elements to be measured, wherein between respectively two vertical oriented adapters (10, 20, 30, 40), independently mounted to elements to be measured, a spacer pipe can be mounted horizontally for fixing the separation of the two independently mounted adapters (10, 20, 30, 40).

10. A device according to claim 9, wherein the laser (L) is rotatable 180° in the horizontal plane on the adapter (20).

11. A device according to claim 9, wherein the adapters (10, 20, 30, 40) have a receptacle surface (A), which is oriented perpendicular to the transition pieces (15, 41) or, as the case may be, the rods (24, 25).

12. A device according to claim 9, wherein the adapters (20, 30, 40) include a permanent magnet for securing to the element to be measured.

13. A device according to claim 9, wherein the adapters (10) include a screw thread for securing in a defined predetermined position relative to the transmission.

14. A device according to claim 9, wherein the adapters (20, 30) include a mounting surface (21) comprised of two surfaces at right angles to each other for seating upon the articulated shaft.

15. A device according to claim 9, wherein the adapter (40) includes a Y-shaped locating or mating surface (42) for seating upon the rear axis center-piece.

* * * * *